Dec. 13, 1932.  H. F. FELLOWS  1,890,576
VEHICLE BOLSTER CENTER BEARING
Filed Nov. 27, 1931   2 Sheets-Sheet 1
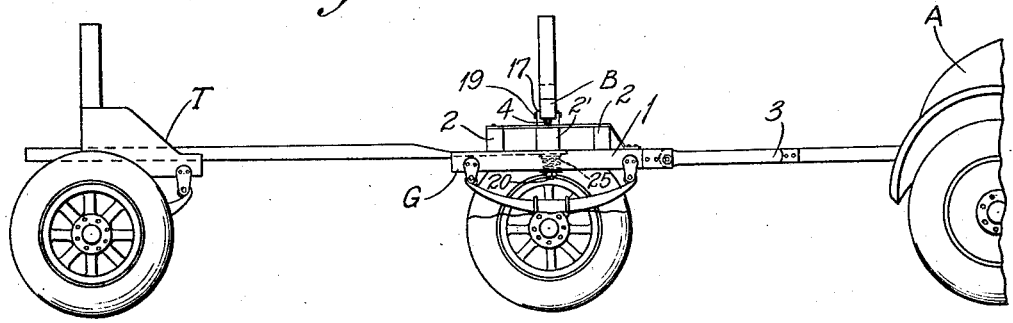
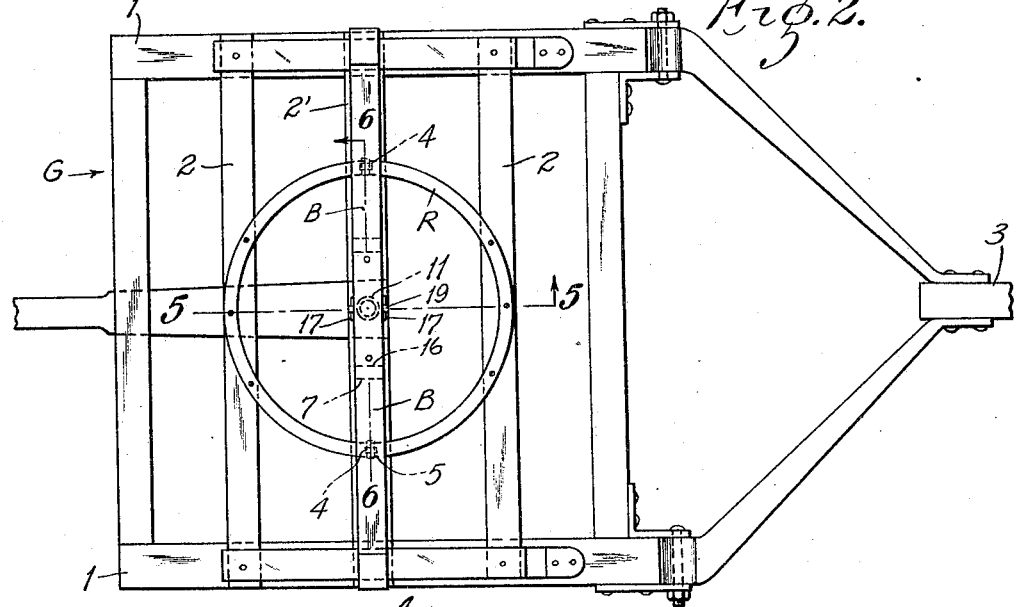
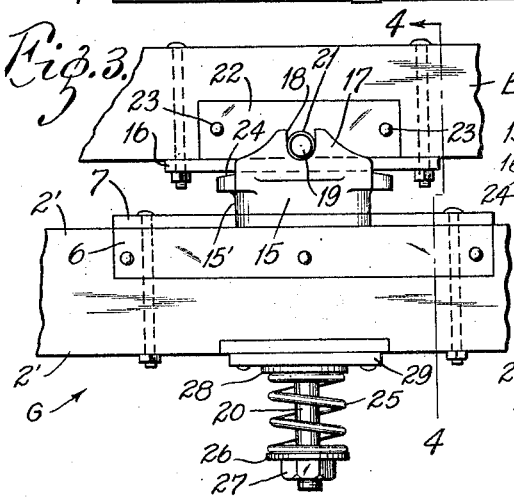
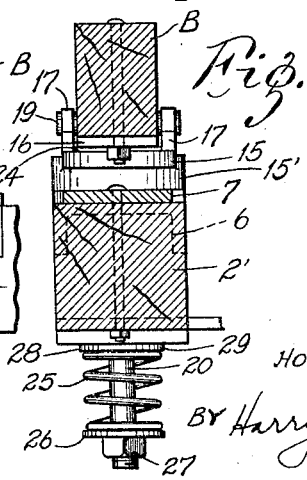
INVENTOR:
HOMER F. FELLOWS.
BY Harry A. Beimer
ATTORNEY.

Dec. 13, 1932.   H. F. FELLOWS   1,890,576
VEHICLE BOLSTER CENTER BEARING
Filed Nov. 27, 1931   2 Sheets-Sheet 2
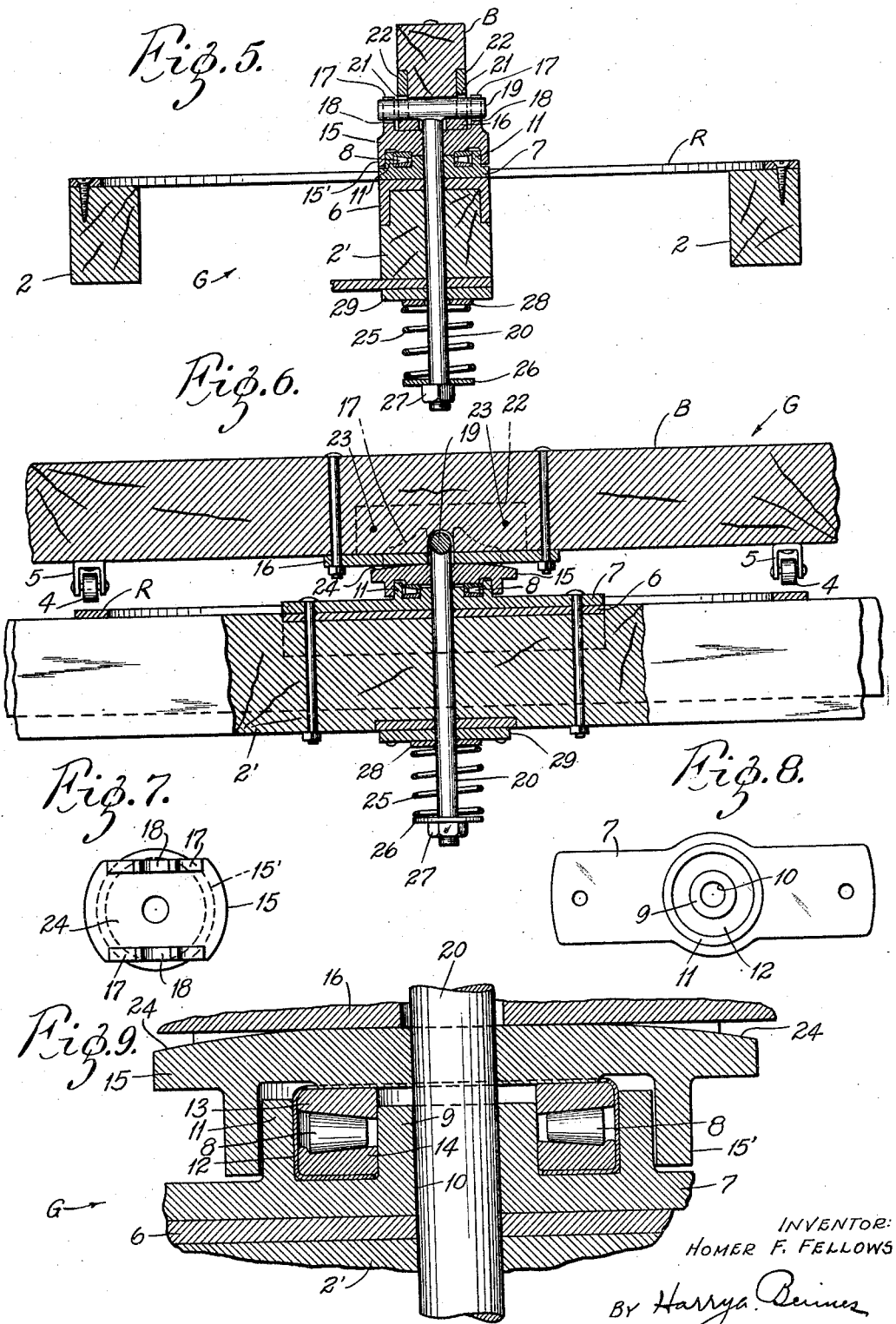
INVENTOR:
HOMER F. FELLOWS
BY Harry A. Beines
ATTORNEY.

Patented Dec. 13, 1932

1,890,576

UNITED STATES PATENT OFFICE

HOMER F. FELLOWS, OF SPRINGFIELD, MISSOURI

VEHICLE BOLSTER CENTER BEARING

Application filed November 27, 1931. Serial No. 577,555.

My invention has relation to improvements in vehicle bolster center bearings and it consists of the novel features of construction more fully set forth in the specification and pointed out in the claim.

The principal object of the present invention is to provide a light farm vehicle, that may be drawn by horses or as a trailer behind a motor vehicle, with a center bearing, or fifth wheel, that shall comprise anti-friction elements, such as balls or rollers, to facilitate turning of the vehicle. Heretofore, as far as I am aware, no vehicle of this type has embodied an anti-friction bearing in its fifth wheel, because the lateral movement of the body in drawing the vehicle over uneven terrain necessitates a certain amount of freedom, or clearance for the movement of the king-pin, which movement could not be imparted to the anti-friction bearing as it would cause the latter to bind and render it inoperative. In my improved construction of center bearing I have embodied an anti-friction bearing that is free from lateral stresses, although the body bolster is free to yield, or oscillate, laterally. The manner in which I accomplish this object, together with other advantages that are inherent in the invention, will be better apparent from a detailed description of same in connection with the accompanying drawings, in which;

Figure 1 is a side elevation of a vehicle operated as a trailer and shown coupled to an ordinary pleasure automobile; Fig. 2 is a top plan of the front gear of the vehicle showing my improved bolster center bearing embodied therein; Fig. 3 is an enlarged front elevation of the bolster center bearing and that part of the front gear and body bolster immediately associated therewith, the other parts being broken away; Fig. 4 is a vertical cross-section through the center sill of the front gear and the body bolster, as indicated by the line 4—4 in Fig. 3, the parts comprising the center bearing being left in elevation; Fig. 5 is an enlarged vertical cross-section through the vehicle front gear, as indicated by the line 5—5 of Fig. 2; Fig. 6 is an enlarged vertical longitudinal section through the vehicle front gear, as indicated by the line 6—6 of Fig. 2; Fig. 7 is a top plan of the upper section of the anti-friction bearing housing; Fig. 8 is a top plan of the lower section of the anti-friction bearing housing; and Fig. 9 is an enlarged section of the anti-friction bearing and housing similar to the section shown in Fig. 6.

Referring to the drawings, T represents a light trailer coupled in any satisfactory manner to an automobile A. The front gear G of the trailer is of standard design comprising a sub-frame 1, on which cross sills 2' and 2 are mounted. The trailer is provided with the usual tongue 3 removably attached to the front of the sub-frame 1. As above stated, the invention is comprised in the center bearing for the body bolster B, said center bearing being supplemented by what may be called a fifth wheel ring R which serves as a track for rollers 4, 4 mounted in brackets 5, 5 depending from the body bolster B. At the center of the middle sill 2' of the front gear a flanged plate 6 is secured to serve as a base for lower housing member 7 encasing (in the present instance) a roller thrust bearing 8 of standard construction. Housing member 7 has a center boss 9 traversed by an opening 10 and an annular flange 11 spaced from the boss 9 so as to provide a channel 12, in which the thrust bearing 8 is snugly seated. Thrust bearing 8 has the usual upper and lower raceways 13 and 14 respectively, said upper raceway 13 carrying upper housing member 15, which is provided with a depending annular flange 15' enveloping flange 11 of the lower housing member 7. The body bolster B rests upon upper housing member 15, a wear plate 16 being fixed to the under side of the body bolster B and coming directly in contact with the upper housing member 15. The housing member 15 has flanges 17, 17 disposed in spaced relation between which the bolster B is confined, said flanges being provided with aligning slots 18, 18 in which the crosshead 19 of king-pin 20 is seated. The king-pin 20 is secured to the bolster B by the wear plate 16, which holds the head 19 in the slots 21, 21 formed in side plates 22, 22, countersunk in the sides of the bolster B and secured thereto by rivets 23. The slots 21, 21 are slightly larger than the diameter of the head 19 and king-pin 20 so that the bolster B may be free to oscillate about the head of the king-pin. As heretofore stated, the bolster B has its wear plate 16 resting on the upper housing member 15, and in order to permit lateral oscillation of the bolster B the supporting surface 24 of housing member 15 is cambered in a direction co-extensive with the bolster B (as shown in Figs. 6 and 9). Thus, the bolster B is free to oscillate laterally, and as it does so the wear plate 16 rocks from side to side on the cambered supporting surface 24, the head 19 of the king-pin in the meantime maintaining the bolster B in its fixed center position. Obviously the king-pin 20 is maintained perpendicular to the center sill 2' through which it passes, and since the anti-friction bearing is permanently fixed to the member 2' there will be no relative movement between the king-pin and the anti-friction bearing. There will be no possibility of the anti-friction bearing to bind and become inoperative, and no matter what the position of the bolster B it will continue to be freely rotatable on the front gear of the vehicle. Of course, the amount of lateral tilting permitted the body bolster B is limited by the rollers 4, 4, one of which will rest on the fifth wheel ring R if the tilting of the bolster is sufficient.

The sill 2' of the sub-frame and the bolster B are resiliently connected, so far as vertical movement is concerned, by virtue of a coiled spring 25 confined between a washer 26 held at the lower end of king-pin 20 by nut 27, and a washer 28 in contact with a bottom plate 29 secured to the under side of sill 2'. It will be observed that the bolster B, king-pin 20 and cap housing 15 are so connected by the head 19 of the king-pin that they rotate in unison on the anti-friction bearing 8, said crosshead connection also serving to maintain vertical alignment of the king-pin with respect to the anti-friction bearing. The snug fit of the king-pin in the opening 10 of the housing member 7 further assures that the housing elements will be maintained in perpendicular alignment so that there will be no possibility of these elements tilting with the lateral rocking of the bolster B.

From the foregoing, it will be apparent that I have provided a vehicle center bearing that is freely rotatable on anti-friction elements and at the same time allows for flexibility between the body bolster and the wagon gear. In other words, none of the advantages at present in use in fifth wheel construction are sacrificed, while the additional advantage of my invention is that it embodies anti-friction rolling support.

Having described my invention, I claim:

In combination with a vehicle having a body bolster, a center bearing therefor, said center bearing including a housing having a base element and a cap element, anti-friction elements supported by said base element and supporting said cap element, said cap element having a cambered supporting surface for the body bolster and slotted flanges embracing said body bolster, a king-pin traversing said housing and having a cross-head passing through the bolster and seated in the slots of said flanges, and means for securing the king-pin in place.

In testimony whereof I hereunto affix my signature.

HOMER F. FELLOWS.